US008733730B2

(12) United States Patent
Oka

(10) Patent No.: US 8,733,730 B2
(45) Date of Patent: May 27, 2014

(54) THROTTLE VALVE DEVICE

(75) Inventor: Hiroyuki Oka, Iwate (JP)

(73) Assignee: Zama Japan Kabushiki Kaisha, Iwate (JP)

( * ) Notice: Subject to any disclaimer, the term of this patent is extended or adjusted under 35 U.S.C. 154(b) by 0 days.

(21) Appl. No.: 13/348,572

(22) Filed: Jan. 11, 2012

(65) Prior Publication Data
US 2012/0205566 A1   Aug. 16, 2012

(30) Foreign Application Priority Data
Feb. 10, 2011 (JP) .................................. 2011-27728

(51) Int. Cl.
*F16K 31/00* (2006.01)

(52) U.S. Cl.
USPC ............................. 251/64; 251/305; 123/337

(58) Field of Classification Search
USPC ................ 251/64, 297, 305; 123/337, 190.14
See application file for complete search history.

(56) References Cited

U.S. PATENT DOCUMENTS

| | | | | |
|---|---|---|---|---|
| 2,501,060 A | * | 3/1950 | Leibing ...................... | 73/861.76 |
| 3,227,976 A | * | 1/1966 | Barlow et al. ................. | 333/232 |
| 4,662,394 A | * | 5/1987 | Williams ................. | 137/614.11 |
| 4,750,596 A | * | 6/1988 | Grunberg et al. ............. | 192/222 |
| 4,836,167 A | * | 6/1989 | Huffman et al. ............... | 123/376 |
| 4,890,641 A | * | 1/1990 | Gavrila .......................... | 137/514 |
| 4,995,488 A | * | 2/1991 | Bertin et al. ................... | 477/182 |
| 6,027,096 A | * | 2/2000 | Kohler et al. .................... | 251/64 |

FOREIGN PATENT DOCUMENTS

JP          59-065633          4/1984

* cited by examiner

*Primary Examiner* — John Bastianelli
*Assistant Examiner* — Andrew J Rost
(74) *Attorney, Agent, or Firm* — Kenneth S. Roberts; One LLP

(57) ABSTRACT

A throttle valve device ideal for small, inexpensive implements is provided. The throttle valve device having a damping member for slowly closing a throttle valve. The throttle valve device (1) has a throttle valve (4) that is fixed to a throttle shaft (5) pivotably supported in an air intake passage (2) and that is urged towards the closed direction, the throttle valve (4) adapted for adjusting the amount of air passing through the air intake passage (2). A through-bore (31) penetrating a shaft bore of the throttle shaft (5) is formed in a body, and a damping member (8) having frictional capabilities is inserted into and supported in the through-bore (31) in a state of pressing against the throttle shaft (5) inserted through the shaft bore (51).

10 Claims, 2 Drawing Sheets

THROTTLE VALVE DEVICE

BACKGROUND OF THE INVENTION

1. Field of the Invention

The present invention relates to a throttle valve device in which a throttle valve for adjusting the amount of air passing through an air intake passage is fixed to a throttle shaft pivotably supported in the air intake passage.

2. Description of the Related Art

Conventionally, throttle valve devices are known in which a throttle valve for adjusting the amount of air passing through an air intake passage is fixed to a throttle shaft pivotably supported in the air intake passage. These devices are used, for example, as a means for controlling the amount of air intake to an engine with comparative ease.

Also, emissions reduction strategies have improved fuel efficiency during idling in, for example, throttle valve devices used in engines, with the throttle valve being urged towards the closed direction so that the valve swiftly returns to the idle position when the accelerator lever is disengaged.

Therefore, a problem has been presented in that the throttle valve quickly returns to idle position when the engine is returned from high-speed rotation to idle rotation, leading to a decreased air-fuel ratio ("rich" state) and causing engine stalling, increased emissions, and the like.

Thus, conventionally it is typical to additionally provide a damping member such as a cylinder (dashpot) using air or a fluid, as described in Unexamined Japanese Patent Application Publication 59-65633, as simple means for causing the throttle valve to close slowly, increasing the amount of time taken to close. This is to prevent a rich air-fuel ratio and a precipitous drop in engine rotation speed when the throttle lever in the engine of an automobile or the like is returned from high-speed rotation.

However, a problem has been presented in that, while it has been possible to provide a damping member such as the dashpot described above in products having an engine compartment with a comparatively high volume or in expensive products, as is the case with automobiles, in the case of engines used in small, handheld implements such as, for example, chainsaws or trimmers, the addition of a damping member such as a dashpot not only increases weight but is not feasible in terms of either space or price.

SUMMARY OF THE INVENTION

The present invention, which was conceived in an attempt to resolve the above problems, provides a throttle valve ideal for use in small devices and comparatively inexpensive implements.

The throttle valve device of the present invention, which was conceived to resolve the problems described above, has a throttle valve that is fixed to a throttle shaft pivotably supported in an air intake passage and that is urged towards the closed direction, the throttle valve adapted for adjusting the amount of air passing through the air intake passage; the throttle valve device characterized in that a through-bore penetrating a shaft bore of the throttle shaft is formed in a body having the air intake passage formed therein, and a damping member having frictional capabilities is inserted into and supported in the through-bore in a state of pressing against the throttle shaft inserted through the shaft bore.

According to the present invention, the damping member having frictional capabilities presses against an outer circumference of the throttle shaft, thereby appropriately braking the rotation of the throttle shaft and increasing the amount of time taken for the throttle valve to return to idle position from high speed. The occurrence of a rich state is thereby prevented when the throttle valve returns to idle position.

In a case where the damping member is formed using an elastic material and is inserted and supported in a state of being pressed against the throttle shaft by a clamp bolt threaded into the through-bore, the invention can be readily and inexpensively implemented employing a construction involving few parts. In a case where a compression spring member is disposed between the damping member and the clamp bolt, a material other than an elastic material can be used as the damping member.

Furthermore, in the present invention, in a case where the damping member is a spherical body, contact will be made with the throttle shaft over a small area; and, particularly in a case where the damping member is formed using an elastic material, the damping member will readily demonstrate its elasticity on being suitably compressed.

Furthermore, if the damping member is columnar in shape and a distal end surface thereof constituting a surface that contacts the throttle shaft forms a concave portion following along the outer circumference of the throttle shaft, the contact area will always remain the same. Therefore, the damping member can be used stably over a long period of time.

According to the present invention, it is possible to provide a throttle valve device ideal for use with small, inexpensive implements.

DETAILED DESCRIPTION OF THE PREFERRED EMBODIMENTS OF THE INVENTION

Figure 1:
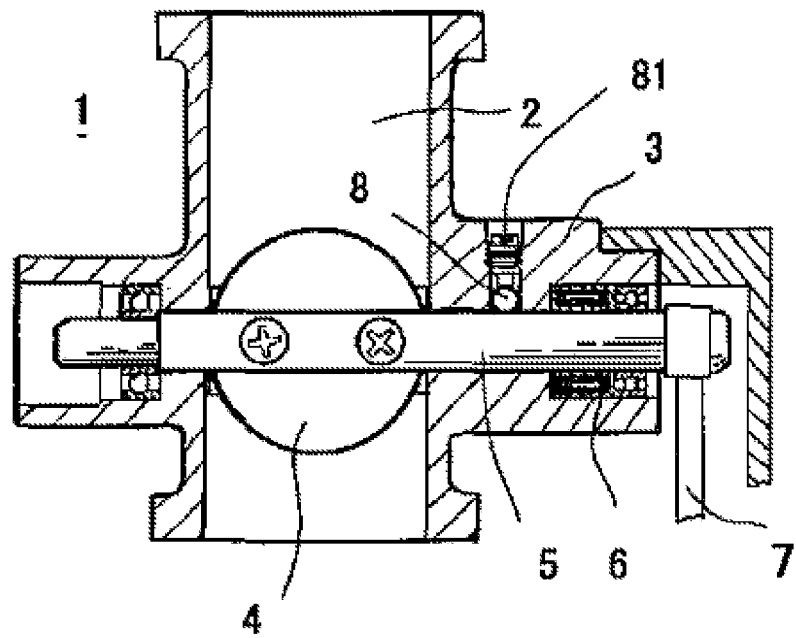
FIG. 1 is a sectional view of a preferred embodiment of the present invention.

The present invention will be described below based on embodiments shown in the drawings.

Figure 2:
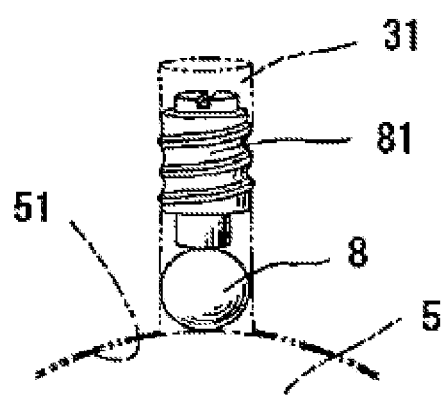
FIG. 2 is an enlarged perspective view of a damping member in the embodiment represented in FIG. 1.

FIGS. 1 and 2 illustrate a preferred embodiment of the throttle valve device of the present invention in a carburetor application. In a throttle valve device 1, a throttle valve 4 for adjusting the amount of air flowing through an air intake passage 2 into a throttle body 3 in whose interior the air intake passage 2 is formed is fixed to a throttle shaft 5 pivotably supported in the air intake passage 2 of the throttle body 3.

An urging device 6 formed using a coil spring is additionally provided on the throttle shaft 5, and is set so that the throttle valve 4 fixed to the throttle shaft 5 is constantly urged towards the closed direction and constantly returns to idle position when a throttle lever 7 fixed to an end of the throttle shaft 5 is released.

A through-bore 31 penetrating a shaft bore 51 of the throttle shaft 5 is formed in the throttle body 3, and a spherical damping member 8 having frictional capabilities and being made of, for example, a stable rubber material is inserted into the through-bore 31. A clamp bolt 81 is threaded into the through-bore 31 from the outside, and the damping member 8 is supported in a state of being pressed against the throttle shaft 5.

As in conventional throttle valve devices, according to the present embodiment configured as described above, a throttle lever 7 affixed to an end of the throttle shaft 5 is caused to rotate against the urging force of the urging device 6 via, for example, a connected accelerator wire, thereby causing the throttle shaft 5 to rotate in the open direction, opening the throttle valve 4 provided in the air intake passage 2, and increasing the amount of air drawn in, whereby the engine is made to rotate at higher speed.

When, in order to cease high-speed rotation, an accelerator (not illustrated) is released and the throttle lever 7 is returned to the original idle position, the throttle shaft 5 fixed to the throttle lever 7 rotates towards the closed direction due to the urging force of the urging device 6, returning to the original idle position. In this embodiment, a damping member 8 having frictional force is in contact with the throttle shaft 5 in a state of being pressed against the shaft, so that the return to the idle position occurs slowly over time rather than suddenly, as in conventional examples.

Therefore, it is possible to effectively prevent precipitous drops in engine rotation speed, stalling of the engine, and emission of exhaust gases or the like as caused by the air-fuel ratio being rich when the throttle shaft 5 returns to the idle position.

In particular, in the present embodiment, it is acceptable merely for a through-bore 31 communicating with the shaft bore 51 of the throttle shaft 5 to be formed in the throttle body 3 and for the damping member 8 to be supported in a pressed state therein. The present embodiment does not differ in external appearance from the prior art; it is readily constructed, light in weight, and capable of being inexpensively provided. The present embodiment is ideally used in engines installed in small, comparatively inexpensive hand-held devices such as chainsaws and trimmers.

In particular, since only the damping member 8 and the clamp bolt 81 are necessary in the present embodiment, the number of parts can be kept small. Also, by virtue of the damping member 8 comprising an elastic material, it can be readily supported in a state of pressing against the throttle shaft merely by the clamp bolt 81 being pressed against the damping member.

Figure 3:
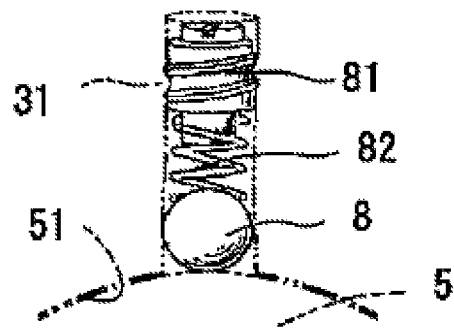
FIG. 3 is an enlarged perspective view of another embodiment of the damping member of the present invention.
Figure 4:
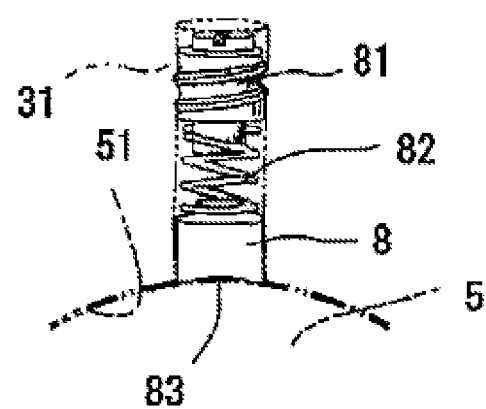
FIG. 4 is an enlarged perspective view of yet another embodiment of the damping member of the present invention.

FIGS. 3 and 4 illustrate another embodiment of the damping member 8 according to the present invention. FIG. 3 depicts a compression spring member 82 disposed between the damping member 8 and the clamp bolt 81. An advantage is presented in the present embodiment in that a material other than an elastic material can be used for the damping member 8, which is preferable in instances where high friction or durability is required.

In the embodiment illustrated in FIG. 4, the damping member 8 is columnar in shape, a concave portion fitting the outer circumference of the throttle shaft 5 is formed in a surface 83 contacting the throttle shaft 5, the surface 83 being a distal end surface of the damping member 8, and a greater contact surface can be obtained. This embodiment can be applied when high friction is necessary.

While an instance of the present embodiment being used in a carburetor has been described, it shall be apparent that the present invention can also be applied to other implements in which an air intake passage is controlled.

KEY

1 Throttle valve device
2 Air intake passage
3 Throttle body
4 Throttle valve
5 Throttle shaft
6 Urging device
7 Throttle lever
8 Damping member
81 Clamp bolt While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

The invention claimed is:

1. A throttle valve device in a carburetor comprising a throttle valve that is fixed to a throttle shaft pivotably supported in an air intake passage through a carburetor body and that is urged towards the closed direction, the throttle valve adapted for adjusting the amount of air passing through the air intake passage, wherein the throttle valve device comprises
 a shaft bore formed in the carburetor having the air intake passage formed therein, the shaft bore receiving the throttle shaft,
 a through-bore formed in the carburetor body and penetrating the shaft bore of the carburetor body, and
 a damping member having frictional capabilities to dampen the rotation of the throttle shaft, the damping member is inserted into and supported in the through-bore in a state of pressing against the throttle shaft received in the shaft bore.

2. The throttle valve device according to claim 1, wherein the damping member is formed using an elastic material; and the damping member is inserted and supported in a state of being pressed against the throttle shaft by a clamp bolt threaded into the through-bore.

3. The throttle valve device according to claim 1, wherein a compression spring member is disposed between the damping member and a clamp bolt.

4. The throttle valve device according to claim 2, wherein a compression spring member is disposed between the damping member and the clamp bolt.

5. The throttle valve device according to claim 1, wherein the damping member is a spherical body.

6. The throttle valve device according to claim 2, wherein the damping member is a spherical body.

7. The throttle valve device according to claim 3, wherein the damping member is a spherical body.

8. The throttle valve device according to claim 1, wherein the damping member is columnar in shape, and a surface contacting the throttle shaft forms a concave portion that follows along the outer circumference of the throttle shaft, the contacting surface being a distal end surface of the damping member.

9. The throttle valve device according to claim 2, wherein the damping member is columnar in shape, and a surface contacting the throttle shaft forms a concave portion that follows along the outer circumference of the throttle shaft, the contacting surface being a distal end surface of the damping member.

10. The throttle valve device according to claim 3, wherein the damping member is columnar in shape, and a surface contacting the throttle shaft forms a concave portion that follows along the outer circumference of the throttle shaft, the contacting surface being a distal end surface of the damping member.

* * * * *